United States Patent
Kingsford et al.

(10) Patent No.: US 6,349,858 B1
(45) Date of Patent: Feb. 26, 2002

(54) DISPENSE HEAD ASSEMBLY

(75) Inventors: Kenji A. Kingsford, Devore; Peter Nguyen, Garden Grove; Tom J. Sievers, Upland, all of CA (US)

(73) Assignee: Saint-Gobain Performance Plastics, Wayne, NJ (US)

( * ) Notice: Subject to any disclaimer, the term of this patent is extended or adjusted under 35 U.S.C. 154(b) by 0 days.

(21) Appl. No.: 09/415,371

(22) Filed: Oct. 8, 1999

(51) Int. Cl.[7] ............................................. B65D 83/00
(52) U.S. Cl. .................. 222/400.7; 222/513; 251/335.2
(58) Field of Search .................... 222/400.7, 402.25, 222/513, 518; 251/335.2

(56) References Cited

U.S. PATENT DOCUMENTS

| | | | |
|---|---|---|---|
| 4,872,638 A | * 10/1989 | Thompson et al. | ...... 251/335.2 |
| 5,203,477 A | * 4/1993 | Lo | ........................ 222/400.7 |
| 5,771,924 A | * 6/1998 | Huygen | .................... 251/335.2 |
| 5,878,924 A | 3/1999 | Johnson | ...................... 222/509 |
| 6,000,416 A | 12/1999 | Kingsford | ..................... 137/1 |

FOREIGN PATENT DOCUMENTS

| | | | | |
|---|---|---|---|---|
| DE | 1099293 | * | 2/1961 | .............. 251/335.2 |
| DE | 1201141 | * | 9/1965 | .............. 251/335.2 |
| EP | 0882921 | | 12/1998 | |
| GB | 2188040 | * | 9/1987 | .............. 222/400.7 |

* cited by examiner

Primary Examiner—Joseph A. Kaufman
(74) Attorney, Agent, or Firm—Christie, Parker & Hale, LLP

(57) ABSTRACT

A dispense head assembly comprise a housing, and a body having a fluid inlet and outlet attached to the housing. A piston is disposed within the body and housing and is attached at one end to an actuating handle. A poppet/diaphragm is attached to the opposite piston end and includes an imperforate head, a thin-walled sleeve that extends axially away from the head, and a tongue that defines a terminal edge of the sleeve and that forms a leak-tight interference seal with the body. The poppet/diaphragm sleeve is rolled between opposite piston and assembly wall surfaces to provide open- and closed-flow poppet/diaphragm movement. A dip tube adapter is releasibly attached to the housing and body. A tongue and groove seal arrangement is used to form a leak-tight interference seal therebetween. A dip tube is attached to the second adapter body end to provide fluid pick-up from a fluid container to the dispense head assembly. A retainer ring is attached to the adapter body, and a handle mount is pivotably attached to the ring. The handle mount registers with the dispense head body when it is attached to the adapter, thereby providing a pivot end to the handle to permit piston movement and related open- and closed-flow poppet/diaphragm assembly operation.

25 Claims, 6 Drawing Sheets

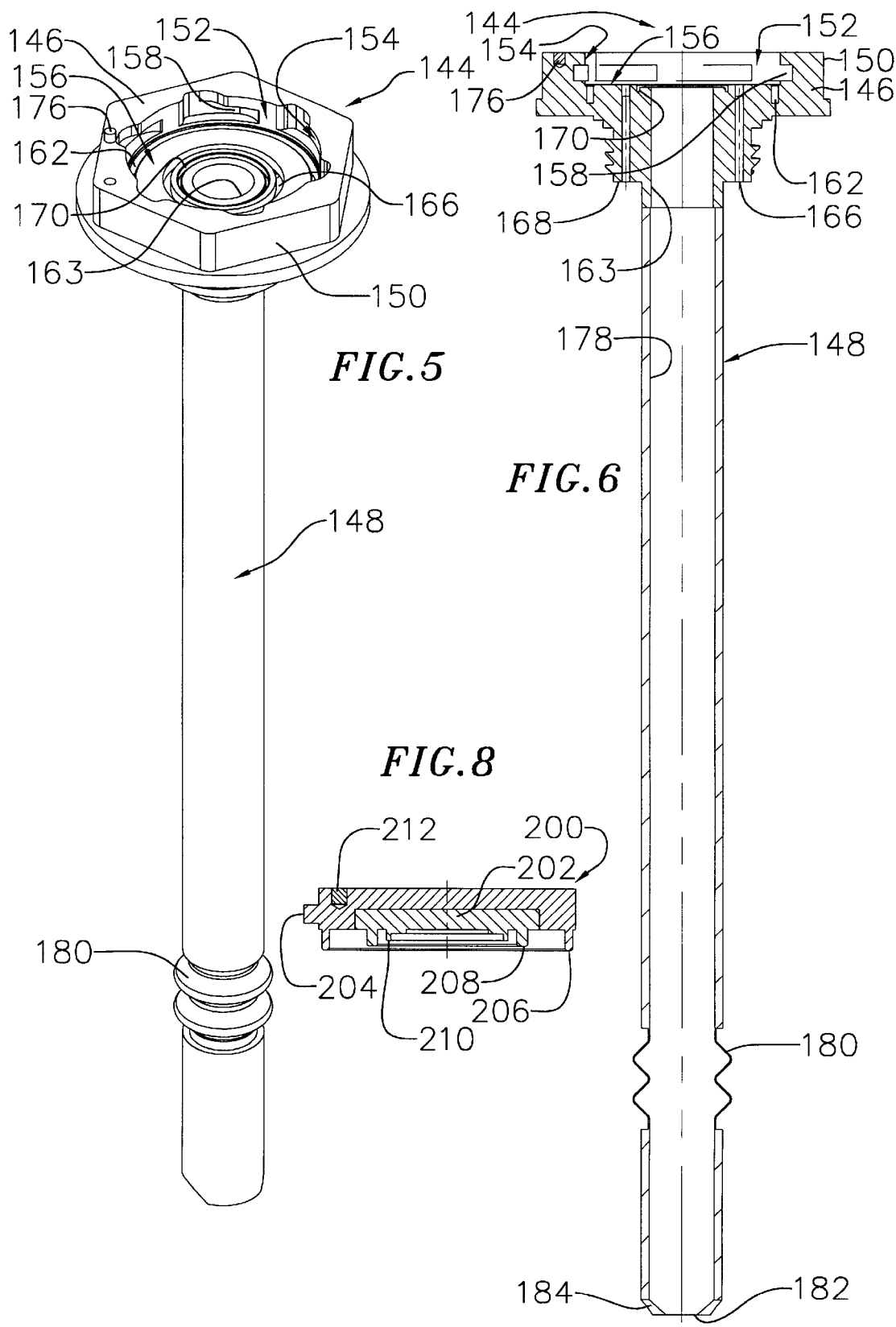

DISPENSE HEAD ASSEMBLY

FIELD OF THE INVENTION

This invention relates to a device for dispensing liquid from a liquid container and, more particularly, to a dispense head assembly for dispensing liquid chemical that is designed without O-ring seals to have a reduced number of leak paths, thus minimizing the potential for health risk or environmental hazard from chemical leakage, and minimizing the potential for process fluid contamination.

BACKGROUND OF THE INVENTION

Dispensing devices are known in the art for dispensing various liquids from containers. In certain applications where the liquid being dispensed is an acid or other such chemical material having known safety and environmental issues, it is desired that the dispensing device be capable of dispensing the liquid without unwanted leakage to the immediate surroundings. For example, certain manufacturing processes require that one or more acid or base material be dispensed into a process fluid handling system. Oftentimes the chemical material is not produced on site and must be provided to the process from a liquid container such as a drum. A dispensing device is attached to the drum to access the chemical material contained therein and to permit the material to be drawn from the container into the process fluid handling system. Once the chemical material in the drum is completely removed, the dispensing device is removed from the spent drum and is attached to a new drum for continued supply of the needed chemical.

A dispensing device designed for use in this manner is known in the art and is disclosed in U.S. Pat. No. 5,878,924. The device disclosed in this patent generally comprises a dispense head assembly that includes a spring-based plunger disposed within a device body, and a lever-lock handle that interacts with the body and that controls the position of the plunger within the body. The body includes an open throat that is in fluid-flow communication with a fluid transfer tube that extends downwardly into a liquid container, i.e., a drum, and a dispense opening perpendicular to the throat. The plunger is disposed within the body and is moved axially upwardly and downwardly therein to respectively close or open the flow of liquid from the throat to the opening. The plunger includes a first circular O-ring seal positioned along a plunger axial end that seats against a horizontal valve seat surface, positioned radially around the throat, to terminate fluid flow. The plunger also includes a second O-ring seal disposed circumferentially around a plunger outside wall surface to form a seal against an opposite body wall surface.

The dispensing device is designed to be attached with a receiver that is mounted to the chemical container and to the fluid transfer tube within the container the device permits fluid flow from the container when the lever-lock handle is locked into a downward position against the body, thereby lifting the plunger within the body so that the first O-ring seal is lifted away from the valve seat surface. The device is designed to terminate fluid flow by lifting and unlocking the lever-lock handle from the body, thereby causing the plunger to be lowered within the body so that the first O-ring seal becomes seated against the valve seat surface. The lever-lock handle allows the dispensing device to be used in a "full on" capacity, when the handle is locked into its downward position, and in an "off" position, when the handle is unlocked into its upward position.

The dispensing device so described uses a total of five O-ring seals, two of which are used to provide a seal between the plunger and body, and the other three being used to provide a seal between the body and receiver and fluid transfer tube. A desired feature of dispensing devices used in such application is that it be capable of: (1) providing a high rate of liquid flow therethrough; (2) being operated, i.e., switched from a full onto an off position, easily and reliably; and (3) minimizing the potential of liquid leakage, either resulting in chemical being spilled to the environment or resulting in contaminate material entering the fluid process. For example, when the dispensing device is used to provide high purity chemical material used in a high purity chemical operation, such as in semiconductor manufacturing, it is critical that the process chemical remain contaminate free to ensure the quality of the manufactured product. In practice, it is known that the above-described device includes a large number of potential leak paths, that can cause leakage and/or process contamination resulting from the use of multiple O-ring seals.

It is, therefore, desired that a dispensing device be constructed that is capable of providing a desired high rate of liquid flow therethrough, that can be operated easily and reliably by hand, and that has a minimum number of leak paths to reduce the potential for fluid leakage into the environment, or the potential for the entry of contaminate matter into the fluid handling process.

SUMMARY OF THE INVENTION

Dispense head assemblies, constructed according to principles of this invention overcome disadvantages of earlier constructions by both eliminating the need to use O-ring-type seals, and by replacing the conventional plunger with a poppet/rolling diaphragm. Further, dispense head assemblies of this invention comprise a mechanical interlocking system that both prevents the unwanted combination of dispense head assembly members that are used with different process fluids, thereby preventing process fluid contamination, and that prevents the open-flow operation of the assembly until the assembly elements are properly locked into position.

Dispense head assemblies of this invention comprising a housing having a chamber disposed therein that extends from a partially-closed end to an opposite open end. A body is attached to the housing open end and has a fluid passage disposed therein extending between opposite body ends. The fluid passage is in fluid-flow communication with a fluid inlet and a fluid outlet in the body. The fluid passage also includes a circular seal lip located between the fluid inlet and outlet.

A piston is disposed within the body and housing. The piston has a first end that extends through an opening in the partially-closed housing end, and a second end that is attached to a poppet/diaphragm. The poppet/diaphragm extends into the body fluid passage and includes an imperforate head that seats against the seal lip when placed into a closed position, a thin-walled sleeve that extends axially away from the head concentrically along a piston wall surface; and a tongue defining a terminal edge of the sleeve.

A spring is interposed between the piston and the partially-closed housing end to urge the poppet/diaphragm head against the seal lip. A handle is attached at one end to the piston first end to axially move the piston within the assembly between an opened and closed flow position. The poppet/diaphragm sleeve is rolled between opposite piston and assembly wall surfaces when the piston is moved axially within the assembly.

The assembly also includes a dip tube adapter that is attached to the housing and body. The adapter includes a body having a fluid flow passage that extends therethrough from a first end to an opposite second end. The adapter body is designed to form a releasibly locking attachment with an end of the dispense head assembly body. A leak-tight seal is provided between the adapter body and the dispense head assembly body through the use of a tongue and groove sealing arrangement. A dip tube is attached to the second adapter body end to provide fluid pick-up from a fluid container to the dispense head assembly.

A retainer ring is disposed concentrically around the adapter body, and a handle mount is pivotably attached at one handle mount end to the retainer ring. The handle mount is designed to register with the dispense head body when it is attached to the adapter. The handle mount also includes a pivot end that registers with the handle to enable axial piston movement, and related open- and closed-flow assembly operation, when the handle mount is correctly aligned with the dispense head body.

BRIEF DESCRIPTION OF THE DRAWINGS

These and other features, aspects, and advantages of the present invention will be more fully understood when considered with respect to the following detailed description, appended claims, and accompanying figures:

FIG. 5 is a perspective view of a dip tube adapter, constructed according to the principles of this invention, used with the dispense head assembly;

FIG. 6 is a cross-sectional side view of the dip tube adapter of FIG. 5;

FIG. 8 is a cross-sectional side view of a cap used to cover the dip tube adapter of FIGS. 5 to 7.

DESCRIPTION OF THE INVENTION

Figure 1:
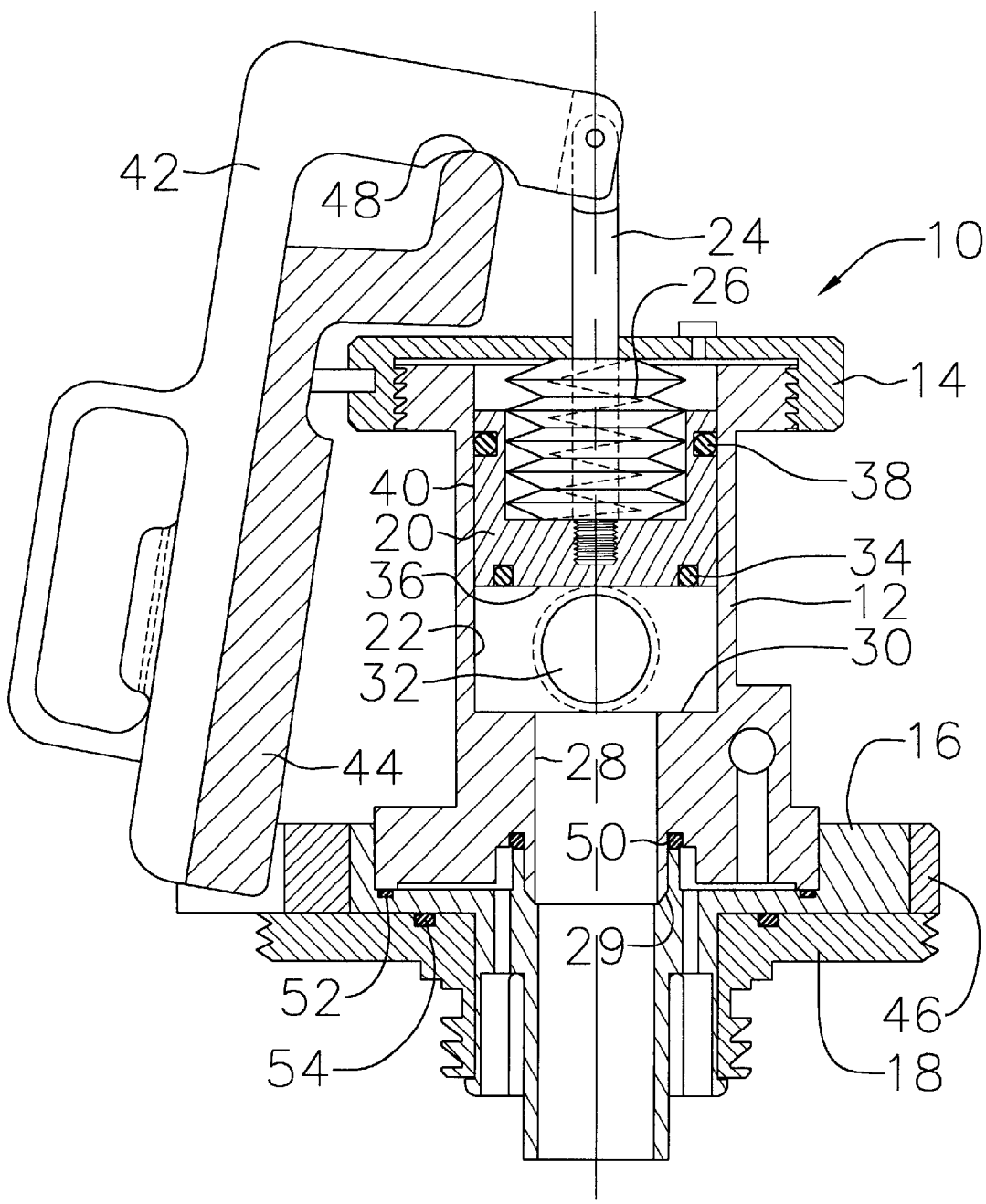
FIG. 1 is a cross-sectional side view of a prior art dispensing device.

FIG. 1 illustrates a dispense device 10 disclosed in U.S. Pat. No. 5,878,924, as described in the background, for use in dispensing liquid from a drum container. The device 10 generally comprises a dispensing body 12, a cap 14 attached to a top end of the body 12, and a body receiver 16 attached to a bottom end of the body 12. The body receiver 16 is attached at an opposite side to a bung adapter 18 that is attached to the drum container (not shown) and to a dip tube disposed within the drum container. A plunger unit 20 is slidably disposed within a central chamber 22 of the body and is attached at one of its axial ends to an actuator rod 24 that extends through an opening in the cap 14. A spring 26 is interposed between the plunger unit and cap to urge the plunger unit downwardly within the chamber 22.

The central chamber 22 includes a throat 28 that has a reduced diameter and that extends axially upwardly a distance away from a body end 29 that is attached to the body receiver 16. A horizontal shelf 30 extends concentrically around the throat 28. The central chamber also includes a dispense opening 32 that extends radially through the body 12 and that is perpendicular to the throat. The dispense opening 32 is positioned within the chamber a distance upwardly from the horizontal shelf 30 so that the opening is blocked by the plunger unit 20 when it is lowered within the chamber against the shelf.

The plunger unit 20 includes a first O-ring seal 34 disposed within a circular groove along a plunger downwardly-facing planar surface 36. The first O-ring seal 34 is positioned concentrically around an opening to the throat 28 to make seating contact against and provide a seal with the shelf 30 when the plunger unit is placed in a lowered or closed position within the chamber, thereby preventing the passage of liquid past the throat. The plunger unit 20 also includes a second O-ring seal 38 positioned within a groove disposed circumferentially around a plunger side wall surface 40. The second O-ring seal 38 is used to form a seal between the plunger unit and the body chamber.

A lever-lock handle 42 is attached at one of its ends to the actuator rod 24 and is designed to fit over a handle 44 that is attached to a wrench 46 disposed around the body receiver 16. The wrench handle 44 includes a curved end 48 that acts as a pivot point for the handle 42. Assembled in this fashion, the device is operated to provide liquid flow by moving the handle 42 downwardly over the wrench handle 44 into a locked position therewith so that the interaction between the handle and the wrench handle curved end 48 raises the actuator rod 24 and plunger unit, thereby raising the plunger unit end 36 away from the shelf 30 to expose the dispense opening 32. The device is operated to terminate liquid flow by raising the handle 42 away from the wrench handle 44 and unlocking it therefrom to allow the actuator rod and plunger unit to be lowered within the chamber by spring bias so that the plunger unit is seated against the shelf.

The above-described and illustrated device relies on the use of two O-ring seals 34 and 38 to provide a seal between the plunger unit and the body, which O-ring seals are known to provide a leak passage for fluid escaping from the body chamber or for contaminate material entering the liquid being dispensed. The dispensing device also makes use of three additional O-ring seals 50, 52 and 54 to provide a seal between the body 12 and body receiver 16, and the body receiver 16 and the bung adaptor 18. The use of O-ring seals in these locations also creates potential leak paths for fluids escaping from the device body or for contaminate material entering the liquid being dispensed.

Dispense head assemblies of this invention are designed having an internal configuration that avoids the use of O-ring seals altogether and leak paths related thereto. Specifically, dispense head assemblies of this invention include a piston having an imperforate diaphragm attached thereto with a rolling sleeve. The rolling sleeve accommodates axial piston movement within the device between an open flow and a closed flow position by rolling sleeve movement between opposed wall surfaces. The number of internal leak paths within the device is also minimized through the use of a diaphragm flange tongue and groove seal arrangement. Additional leak paths within the assembly are reduced by using a one-piece dip tube pipe and adapter, and alternatively by using a two-piece dip tube pipe with a tongue and groove attachment to the adapter, and overall sealing efficiency between the dip tube pipe and adapter and the dispense head is provided through the use of a tongue and groove seal therebetween.

Figure 2:
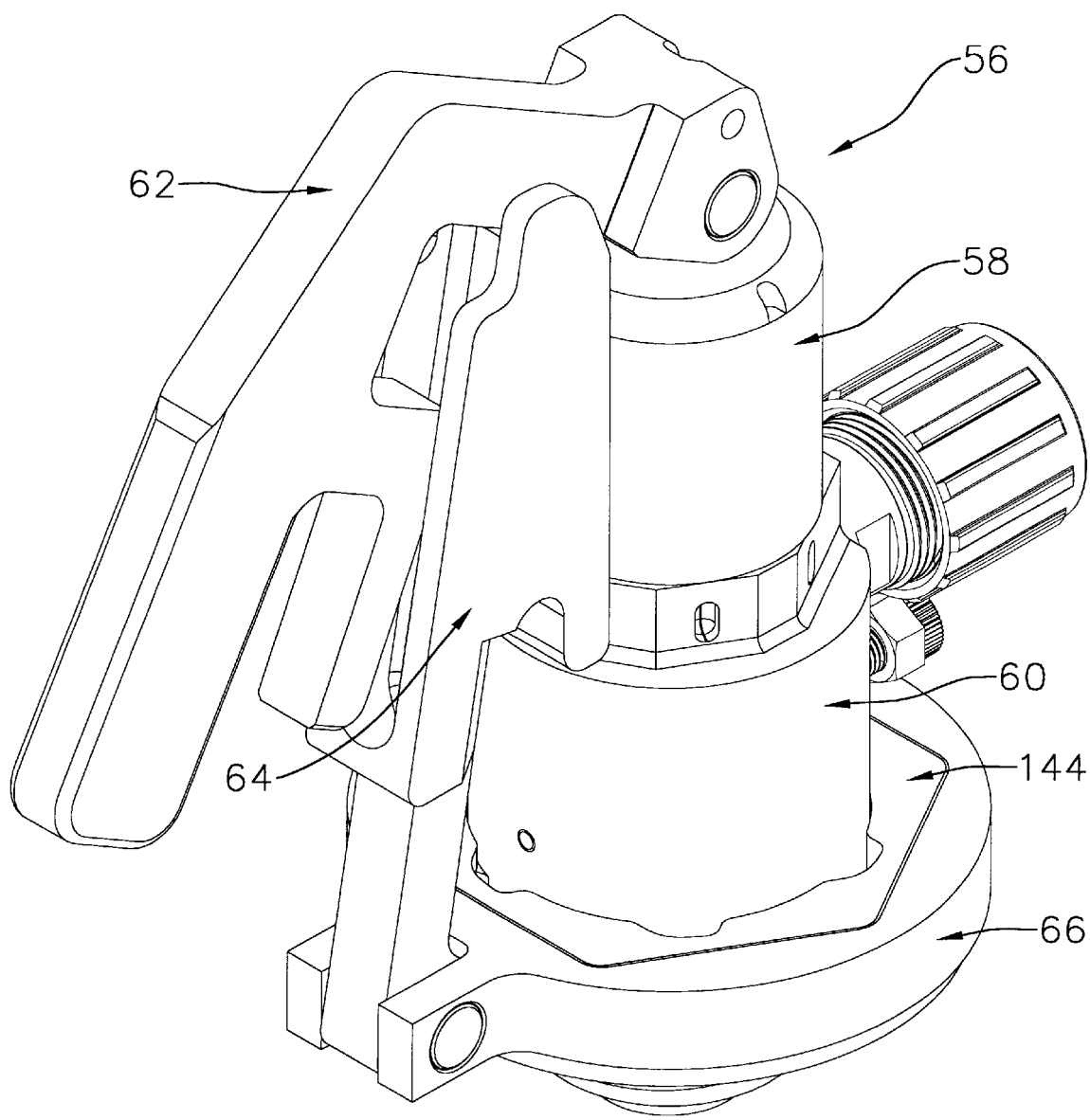
FIG. 2 is a perspective view of a dispense head assembly constructed according to the principles of this invention.

FIG. 2 illustrates a dispense head assembly 56, constructed according to principles of this invention, generally comprising a cylindrical housing 58 that is attached at one end to a body 60. As better described below, the body is designed to accommodate a piston therein (shown best in FIG. 3) that moves axially within the body to open and close fluid flow through the assembly. The assembly 56 further includes a handle 62 that is attached to one end of the piston that extends from the housing. The handle 62 cooperates with a handle mount 64 that both provides a pivot point to and locking interaction with the handle 62. The handle mount is attached to a retainer ring 66 that is mounted around the base of the body 60.

The dispense head assembly 56 is attached to a dip tube adapter 144 (best shown in FIGS. 5 and 6) that is attached to a liquid container, e.g., a drum. The dispense head assembly 56 is operated to provide fluid flow from a fluid source container by placing the handle 62 in a downward position locked with the handle mount 64, and is operated to terminate fluid flow by raising the handle from the locked position.

Figure 3:
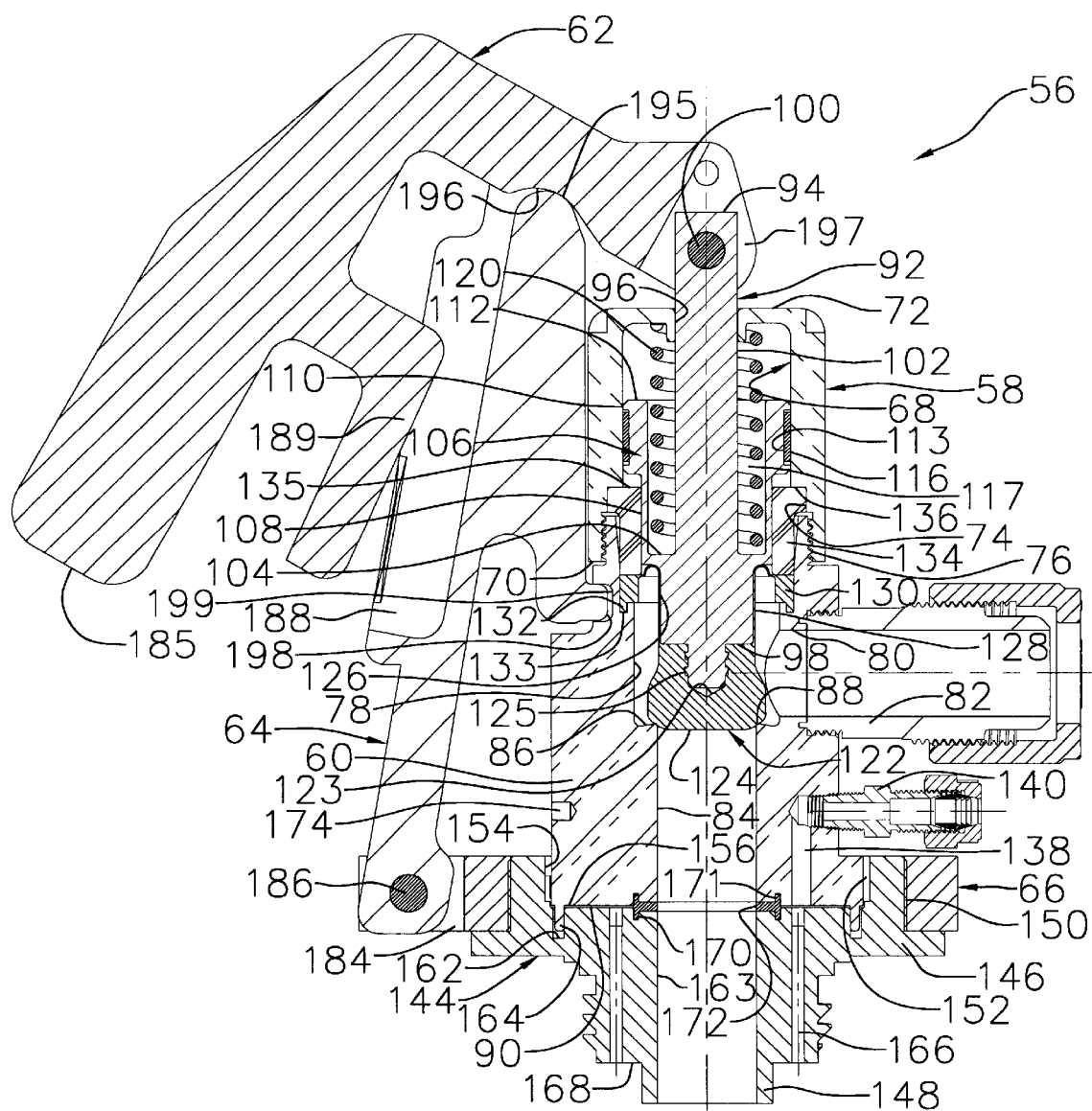
FIG. 3 is a cross-sectional side view of the dispense head assembly of FIG. 2.
Figure 4:
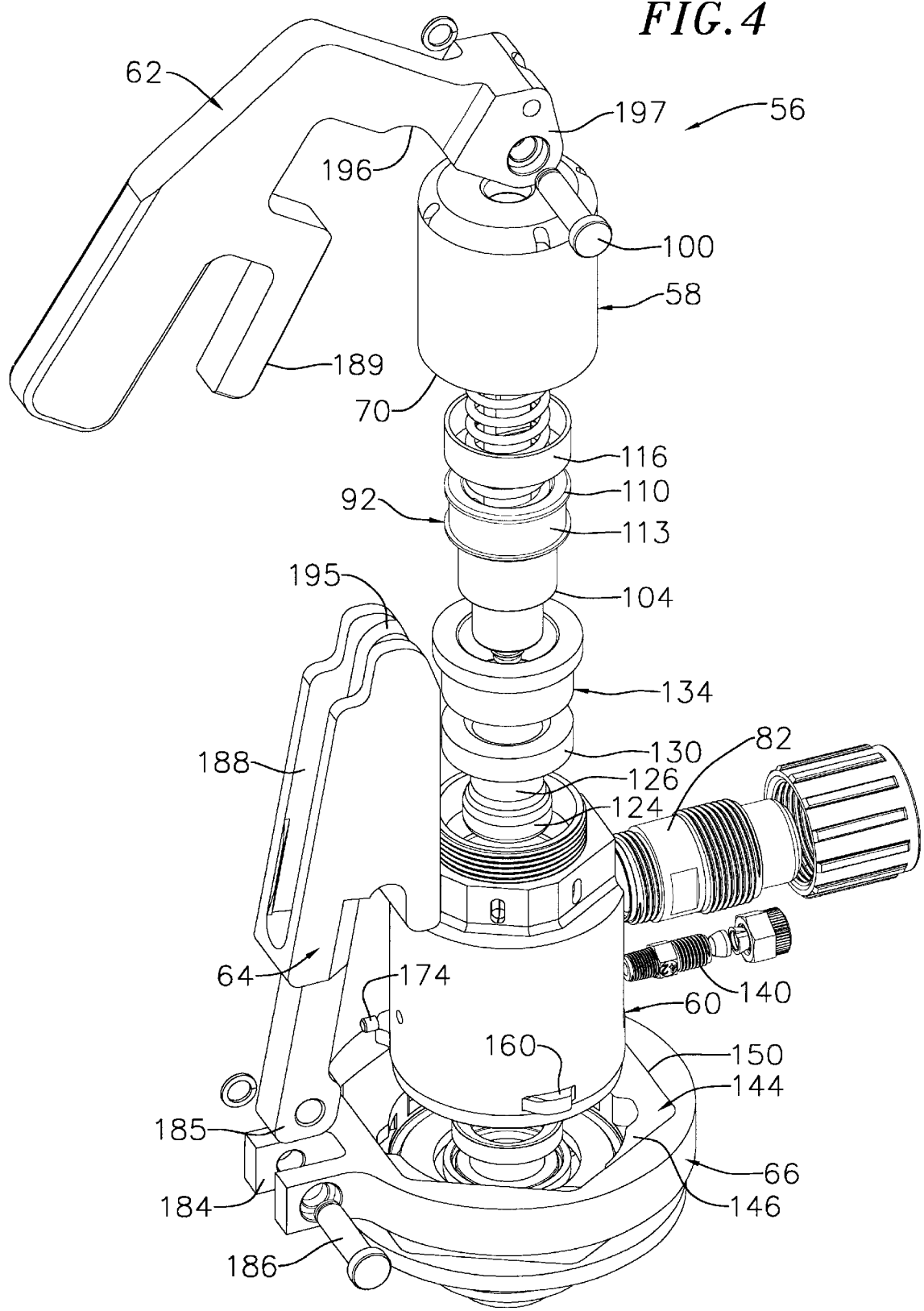
FIG. 4 is a perspective exploded view of the dispense head assembly of FIG. 2.

Referring to FIGS. 2 to 4, a dispense head assembly 56 of this invention more specifically comprises a cylindrical housing 58 having a hollow chamber 68 extending between an open housing end 70 and an opposite partially-closed housing end 72. The chamber 68 preferably includes an enlarged diameter section 74 adjacent the open housing end 70 that is larger in diameter than a remaining portion of the chamber and that extends to the partially-closed housing end 72. The enlarged diameter section 74 includes a threaded wall surface next to end 70 to accommodate threaded attachment with a threaded surface 76 of the body 60 to facilitate threaded connection therewith. The dispense head housing 58 is formed from a suitable structural material that can either be metallic or nonmetallic.

It is desired that the housing 58 be formed from a nonmetallic material when the dispense head is used to dispense high-purity chemical used in a high-purity process, e.g., manufacturing semiconductors or the like. Preferred nonmetallic materials include polypropylene, polyethylene, perfluoroalkoxy fluorocarbon resin or other rigid plastic material having good properties of rigidity and structural strength. The housing can either be molded or machined, depending on which method is most economically feasible. A particularly preferred housing is molded from polypropylene.

The dispense head body 60 is threadably attached to the housing 58 and includes a fluid transport passage 78 disposed therein that is in axial alignment with the housing chamber 68. The body includes a fluid outlet 80 that is in fluid flow communication with the passage 78 and that extends radially away from a wall section of the passage. In an example embodiment, the fluid outlet 80 is positioned perpendicular to the passage 78 and includes means for accommodating attachment with a suitable pipe fitting or other type of connector used to connect the dispense head to a fluid handling system. In an example embodiment, the connecting means is provided in the form of a tongue and groove fitting at the outlet surface and a threaded inside wall surface to facilitate threaded attachment with a pipe fitting 82. The tongue and groove fitting provides a leak-tight seal that provides a nonwetted threaded surface. Alternatively, the connecting means can be in for form of a one-piece molded connection with a suitable outlet pipe or tube.

A fluid inlet 84 extends axially from an end 90 of the body opposite the housing, and is coaxial with the passage 78. The fluid inlet 84 has a diameter that is less than that of the passage, forming a radially outwardly extending shelf 86 at the transition between the fluid inlet and passage walls. The shelf 86 includes a circular valve seat lip 88. As described below, the lip 88 is designed to interface and form a leak-tight seal with a circular connecting section of a diaphragm head. The lip 88 is preferably designed having a slightly raised profile with respect to a horizontal axis. In a particularly preferred embodiment, the lip 88 is raised approximately 10 degrees relative to a horizontal axis. The raised seat lip is desired because it has been discovered to provide improved piston diaphragm head seating and unseating efficiency. The shelf 86 and valve seat lip 88 are both disposed below an opening to the fluid outlet 80 so that fluid flow from the fluid inlet to the outlet is prevented by placing the diaphragm head across and in contact with the seat lip. The body end 90 is designed to connect with and form a leak-tight seal with a dip tube adapter as better described below.

A piston 92 is disposed axially within the housing chamber 68, and includes a first axial end 94 that extends through an opening 96 in the housing partially-closed end 72, and a second axial end 98 that projects a distance into the body passage 78. The piston first end 94 is connected to the handle 62 via a pin 100 or equivalent attachment means that permits pivoting movement between the piston first end 94 and the handle 62. The piston 92 includes a first diameter section 102 that extends axially a distance along the piston length from the first piston end 94 to a shoulder 104 that projects radially outwardly a distance from the piston, and that is integral with a collar 106 that is concentric with and that extends axially upwardly along a length of the piston first diameter section.

The piston collar 106 includes a first diameter section 108 that extends a distance axially away from the shoulder 104, and a second diameter section 110 that extends axially therefrom to a collar end 112. The collar first and second diameter sections each have the same inside diameter dimension, but the second diameter section has an outside diameter dimension that is greater than that of the first diameter section. The collar second diameter section 110 includes a groove 113 disposed circumferentially therearound that is sized and shaped to accommodate placement of a wear pad 116 therein. As best shown in FIG. 3, the wear pad 116 is positioned within the groove 113 and is interposed between the piston collar 106 and the chamber 68 wall surface to provide wear resistance during axial movement of the piston therein. The wear pad can be formed from any suitable material that provides improved properties of wear and/or friction resistance.

In a preferred embodiment, the wear pad 116 is formed from a fluoropolymeric material such as that selected from the group including polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like. In a particularly preferred embodiment, the wear pad is formed from Fluoroloy®, a PTFE based material available from Furon Company of Anaheim, Calif., that includes certain desirable stabilizers to enhance wear and load properties.

An annular cavity 117 is disposed between the piston wall surface and the collar 106, and a spring 120 is disposed within the cavity 116. The spring 120 is placed concentrically around the outside wall surface of the piston, and is positioned axially between the piston shoulder 104 on one spring end and the housing partially-closed end 72 at an opposite spring end. Configured in this manner, the spring 120 imposes a downwardly-directed spring biasing force onto the piston 92, urging the piston downwardly into the chamber 68. It is desired that the spring be coated with a non-metallic/corrosion-resistant material such as PFA when the dispense head is used to dispense corrosive chemical liquids.

A poppet/diaphragm 122 is attached to the piston end 98 and is disposed within the body passage 78. The poppet/diaphragm 122 includes a head 124 at a terminal end thereof that is sized and shaped to both fit within the passage 78 and form a leak-tight seal against the body seat lip 88. The poppet/diaphragm head 124 is imperforate so that there are no openings or other holes disposed therethrough that would create a leak path between opposite diaphragm surfaces. The poppet/diaphragm head 124 is attached to the piston end by either snap or threaded means so that the head 124 moves axially with the piston within the body and does not become detached. Configured and attached in this manner, axial movement of the piston 92 within the body and housing causes the head 124 to move within the body to open and close fluid flow therethrough. In a preferred embodiment, the poppet/diaphragm head 124 includes a partial opening 123 along a backside surface that is sized and shaped to accommodate placement of an axially extending piston portion 125 therein. To prevent unintentionally detachment during use, the poppet/diaphragm partial opening 123 is sized slightly smaller than that of the extending piston portion 125 to provide a tight interference fit therewith. Additionally, the piston portion 125 can include one or more series of barbs or radial projections extending outwardly therefrom for registration in complementary grooves in the opening 123 to further prevent unintentional detachment.

The poppet/diaphragm 122 includes a rolling sleeve 126 that is integral with the head 124. The sleeve 126 extends axially upwardly away from the head a distance along an underlying piston wall surface 128. The piston wall surface 128 extends axially upwardly from the piston end 98 and has a diameter that is less than that of the piston collar first and second diameter sections 108 and 110. The sleeve 126 has a thin-wall construction that extends axially upwardly from the head 124, along the piston wall surface 128, and to the piston collar 104. At the piston collar, the sleeve 126 is flared radially outwardly away from the piston and towards a wall section of the body. The sleeve includes a flange 130 that defines the poppet/diaphragm radial edge. The flange 130 is positioned concentrically away from the sleeve a desired distance and has a desired axial and radial thickness to permit its attachment within the body 60.

More specifically, the flange 130 includes an axially downwardly projecting tongue 132 that is sized and shaped to fit within a groove 133 disposed circumferentially along the body adjacent the body end that is connected to the housing 58. A gland 134 is disposed concentrically around the piston collar 104 and is fixed axially within the body chamber 68 by engagement between an upper gland end 135 and a chamber shoulder 136. The upper gland end 135 is disposed axially below the piston collar second diameter section 106. The gland 134 has an inside diameter sized to facilitate axial movement of the piston collar first diameter section 108 thereby. The gland 134 has an axial length that is sufficient to impose a downwardly directed load onto the diaphragm flange 130 to ensure constant tongue and groove engagement between the flange 130 and body 60. In a preferred embodiment, the flange tongue 132 is sized having a radial thickness that is greater than that of the groove so that a leak-tight seal is formed therebetween. It is important to note, however, that such an interference fit and leak-tight seal is provided independent of the axial load or force that is imposed on the flange by the gland. Rather, the gland is used to ensure a constant axial relationship between the flange and the body during reciprocating piston movement.

The gland 134 also provides a supporting wall structure for the diaphragm sleeve 126 when the piston and sleeve is moved axially upwardly within the housing and body. As described below in greater detail, when the piston is moved upwardly within the device to initiate fluid flow through the body passage 78, the sleeve rolls rather than deforms, between adjacent wall surfaces. Configured in this manner, the diaphragm enables a large range of axial piston movement within the assembly and provides a large rate of fluid flow through the rolling sleeve movement.

The body 60 also includes a breather port 138 that extends axially upwardly a partial distance from the body end 90, and that is in air-flow communication with a suitable connector 140 to enable air to pass from outside of the body 60 therethrough to purge vacuum that is built up in the container storage device created by the removal of liquid therefrom. The breather port can also be used as a means for introducing an inert gas into the fluid container to provide an inert gas blanket over the fluid surface.

Referring to FIGS. 3 to 6, the dispense head assembly 56 of this invention is designed to be attached to a dip tube adapter 144 that generally comprises an adapter body 146 and a dip tube or pipe 148 (best shown in FIGS. 5 and 6). The dip tube adapter 144 is designed to be attached to a liquid container, e.g., a drum or the like, such that the dip tube is immersed into the liquid and the adapter 146 remains exposed on the top of the container for attachment with the dispense head assembly (as shown in FIG. 3). The adapter 146 has an outside wall surface 150 that is configured to facilitate its rotation for threadably engaging and attaching with a complementary fitting of the liquid container. In a preferred embodiment, the adapter 146 has a hexagonal outside wall surface 150 to facilitate rotatable installation by conventional hand tool, or by use of the ring retainer 66 as described below.

The dip tube adapter body 146 has a central opening 152 that is sized and shaped to accommodate placement of the body end 90 therein. The opening 152 is defined by a body wall structure 154 that extends axially away from an adapter base 156 located at the bottom of the opening 152. The adapter wall structure 154 includes a number of grooves 158 (best shown in FIG. 5) disposed radially along the wall surface that are designed to complement and accommodate the placement of body ribs 160 (best shown in FIG. 4) that project radially outwardly from the body adjacent end 90. The ribs 160 are positioned and configured to fit against and lock into place within respective grooves 158 when the body end is lowered into place within the adapter opening 152 and rotated, thereby releasibly locking the ribs into the grooves.

The adapter body 146 includes at least one axial groove 162 disposed within the base 156 concentrically around a centralized adapter fluid flow path 163 that is sized and configured to accommodate placement of a tongue 164 that projects axially away from the body end 90 therein. This tongue and groove attachment is designed to provided an adapter body 146 and body 60 interlock system, i.e., both members are designed to interlock with each other only if they are coded for the same type of use. For example, only if they are coded for use in dispensing the same type of liquid or chemical material. The coded or selective interlocking system is achieved through the strategic placement of the adapter groove 162 and body tongue 164 so that only a body and adapter having a matched body tongue and adapter groove can fit together.

For example, an adapter designed for use in dispensing chemical "a" has have a groove 162 that is positioned to accommodate a tongue 164 projecting from a body also designed for use in dispensing chemical "a". The tongues and grooves are positioned differently on respective bodies and adapters used to dispense other types of chemicals. Since dispense head assemblies of this invention can be used to transport a large variety of chemical liquids used for specific purposes, e.g., process chemicals such as nitric acid, sulfuric acid, ammonium hydroxide, acetic acid, hydrochloric acid, hydrofluoric acid, and hydrogen peroxide acid, it is necessary that the fluid being transported for remain pure and uncontaminated. The coded interlocking feature is desired to prevent mixing together dip tube adapters and dispense head bodies that have been used to transport different liquids, thereby acting to prevent potential contamination of the dispensed fluid. Alternatively, the interlocking system can be formed by complementary mechanical features other than a tongue and groove, e.g., pins and slots.

Moving radially inwardly from the adapter axial groove 162, the adapter base 156 further includes one or more air passages 166 that extend axially away from the adapter base 156 to an adapter axial end 168. The adapter air passages 166 are positioned and configured to be in air-flow communication with the breather port 138 in the body 60 when the body is attached to the adapter. Configured in this manner, the air passages 166 cooperate with the breather port 138 to vent or purge vacuum created in an air space within a liquid container by the removal of liquid, to the atmosphere. The air passages and air breather can also be used to introduce inert gas into the fluid container to provide an inert gas blanket over the fluid surface.

Moving radially inwardly from the adapter air passages 166, the adapter further comprises a fluid flow path groove 170 disposed concentrically around the fluid flow path 163, and concentrically within the adapter air passages 166. The body also includes an axially opposed groove 171 disposed along its bottom end 90. The grooves 170 and 171 are sized and positioned to cooperate with a seal ring 172 (as shown in FIG. 3) having a "T" shaped cross-section with opposed tongues projecting axially into immediately opposed respective grooves 170 and 171. The seal ring tongues and the grooves 170 and 171 are each sized as discussed having a tongue wall thickness that is slightly larger than the groove width to provide a leak-tight interference seal therebetween. Accordingly, when the body is lowered onto and rotated into locking attachment with the adapter, the seal ring engages the fluid flow path grooves to provide unhindered fluid flow from the adapter to the body while also preventing fluid migration thereacross.

In addition to the above-described coded mechanical interlocking system, to further reduce the possibility of combining dispense head bodies with dip tube adapters used with different liquids, both the dispense head body 60 and the dip tube adapter 144 include color coded pins 174 (shown in FIGS. 3 and 4) and 176 (shown in FIGS. 5 and 6) respectively. Each different chemical that is dispensed is given a particular color, e.g., nitric acid can be given the color red, and pins 174 and 176 of the same color are used to identify the dispense head body 60 and dip tube adapter 144 that is used to dispense the particular chemical. The pins are preferably mounted at locations on the body and adapter that are adjacent one another when the body is attached to the adapter to permit easy visual color match verification.

The dip tube or pipe 148 is attached to the adapter body 146 at adapter end 168, and projects downwardly away from the adapter a desired distance. The dip tube 148 includes a hollow passage therein 178 that is in fluid-flow communication with the adapter passage 163. The dip tube 148 is attached to the adapter by conventional means related to the material that is selected. For example, when the dip tube and adapter are each formed from a polymeric material, the two are connected to one another by fuse bonding or welding to form a one-piece assembly.

In applications where the chemical being transported is an acid or base, and/or it is desired that a high degree of chemical purity be maintained, the preferred dip tube material is non-metallic. A particularly preferred dip tube material is a fluoropolymer material selected from the group of materials described above. A particularly preferred fluoropolymer material being PFA.

The dip tube length can vary depending on the depth of the particular liquid container that is used. The dip tube 148 includes a flex section 180 that is designed to provide some degree of flexibility in the length of the tube to enable its placement in a range of container depths. For example, a dip tube having such a flex section can fit in a first container so that a tip 182 of the dip tube just touches the bottom of the first container. The same dip tube can be used in a second container having a depth less than the first container by the axial displacement or compression of the flex section. In each case, the dip tube end 182 is configured having one or more side openings 184 that are directed away from the container bottom to facilitate liquid pick up from the bottom of the container without interference.

Figure 7:
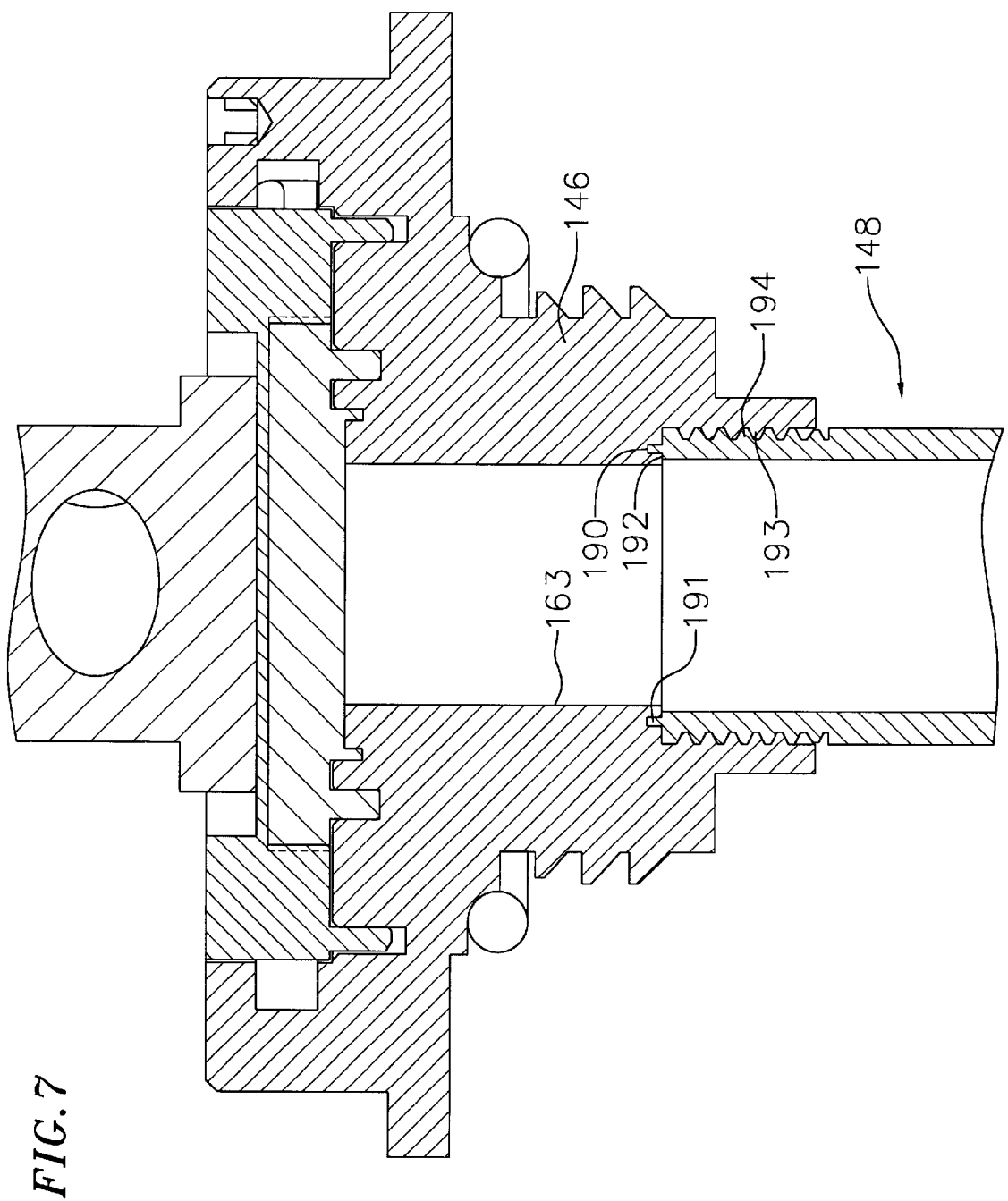
FIG. 7 is a cross-sectional side view of an alternative embodiment of the dip tube adapter.

Referring to FIG. 7, the dip tube 148 can alternatively be attached to the adapter body 146 by a combination tongue and groove and threaded attachment. For example, the adapter body 146 may comprise a groove 190 disposed concentrically around the fluid flow path 163 that is designed to provide an interference leak-tight fit with a tongue 191 that is positioned around a distal end 192 of the dip tube 148. The adapter body 146 also includes a sleeve 193 having a threaded inside wall surface that is concentric around and that extends away from the fluid flow path 163. The sleeve is sized and shaped to threadably interact with a threaded outside surface 194 of the dip tube 148. The dip tube is attached to the adapter body 146 by placing the dip tube distal end 192 into the adapter body sleeve 193 and threading the dip tube therein until the dip tube tongue 191 engages and fits within the adapter body groove 190. Attached in this manner, the tongue and groove engagement provides a leak-tight seal and a non-wetted threaded connection.

Referring back to FIGS. 2 to 4, a retainer ring 66 is positioned around the outside surface of the body 60 adjacent the body end 90 and, concentrically around the adapter body outside wall surface 150. In a preferred embodiment, the retainer ring 66 has an inside wall surface that is hexagonal to cooperate with the outside wall surface of the adapter. Configured in this fashion, the retainer ring can be used as a wrench to rotate and tighten the dip tube adapter onto the liquid container.

The retainer ring 66 includes a handle mount attachment point 184 that is designed to permit pivoting attachment with an end 185 of the handle mount 64. In a preferred embodiment, a pin 186 is used to pivotally connect the retainer ring 66 to the end 185 of the handle mount 64. The handle mount 64 is sized and shaped to extend outwardly away from the retainer ring a distance along the dispense head assembly 56, and be moved radially towards and away from the dispense head assembly. When placed in a laid down position away from the dispense head assembly, the handle mount can be used as indicated above, as a wrench to tighten or loosen the dip tube adapter for respective installation or removal from a liquid container.

The handle mount 64 includes a recessed section 188 that is sized and shaped to accommodate placement of a handle portion 189 therein, and further includes a pivot end 195 at an end opposite the retainer ring. When the handle mount 64 is positioned against the dispense head assembly, the pivot end 195 is designed to cooperate with a recess 196 on the underside of the handle 62 to provide a pivot point to the handle to raise and lower handle end 197 and attached piston 92 in response to lowering and raising the opposite handle end 185.

The handle mount 64 also includes a nose 198 that extends outward a distance therefrom and that is sized and shaped to fit within a slot 199 disposed along the body 60 outside surface. The nose and slot are designed to permit complementary engagement with one another only when the dispense head assembly is rotated into complete attachment with the adapter 144. Thus, once the dispense head assembly is rotatably locked into position with the adapter the handle mount 64 can be brought into contact with the assembly and the nose engages the slot. Only when the nose is engaged in the slot can the handle 62 correctly cooperate with the pivot end 195 to permit handle lowering and fluid passage through the assembly.

FIG. 8 illustrates an adapter cap 200 that is used to cover the dip tube adapter 144 when the dispense head assembly is not in use. The cap 200 comprises an insert 202 having one or more radially projecting ribs 204 that are sized and shaped to fit within the adapter body grooves 158 (shown in FIG. 5) to provide an interlocking attachment in the same manner as the dispense head body. The cap also includes a first tongue 206 that is sized and positioned to interact with a similarly positioned adapter body groove 162 to provide coded or selective adapter and cap mechanical interlocking. Moving radially inwardly from the first tongue 206, the cap includes a second tongue 208 that is sized and positioned to form a leak-tight interference fit with the air passage 166 within the adapter body, and further includes a fluid flow tongue 210 that is sized and positioned to form a leak-tight interference fit with the fluid flow groove 170 in the adapter body. Configured in this manner, the cap provides a leak-tight seal with the adapter when rotatably locked into place therewith.

The cap also includes a color coded pin 212 that enables visual color coding and matching with a similarly color coded pin 176 in the adapter body 146.

The dispense head and dip tube adapter are combined and operated in the following manner to dispense liquid from a liquid container, e.g., a drum container. After the dip tube adapter assembly is installed into the liquid container, so that the dip tube is immersed in liquid and the adapter is exposed, the retainer ring is lowered over the adapter with the handle mount lowered into a downward position. A dispense head body and housing that are coded to mechanically interlock with the adapter are lowered onto the adapter so that the dispense head body ribs engage the adapter body grooves, and the respective tongues and grooves engage one another. The dispense head housing and body assembly are rotated within the adapter to lock the same into position and form the dispense head assembly. At this point, the dispense handle is in a raised position and the diaphragm head is biased within the dispense head in a seated position against the seat lip, thereby preventing the passage of liquid from the container and adapter through the dispense head.

The dispense head assembly is placed into an "open flow" position by moving the handle mount upwardly against the dispense head assembly so that the nose 190 engages the slot 199 (see FIG. 3), and lowering the handle downwardly over the handle mount pivot end, causing the handle end attached to the piston to raise. As the piston is raised within the dispense head, the diaphragm head is moved out of its seated position away from the seat lip and fluid flow is initiated. The dispense head assembly is locked into an "open flow" position by rotating the handle downwardly until the handle portion is disposed within the handle mount recess. The handle recess includes a detent or similar surface configuration that is designed to releasibly lock the handle into position within the recess to avoid unintentional removal therefrom. The dispense head assembly is placed into a "closed flow" position and is removed from that liquid container by reversing these steps.

A feature of the dispense head assembly of this invention is the use of a poppet/diaphragm having a rolling sleeve and a specifically designed flange tongue and groove attachment to provide axial piston movement, and related "on" and "off" fluid flow through the head. Using the rolling sleeve diaphragm is advantageous because it enables a larger range of axial piston movement than otherwise possible from a conventional diaphragm, thereby both maximizing the fluid flow rate through the assembly and minimizing the assembly package size. Further, the use of this specifically designed diaphragm, comprising both a rolling sleeve and a tongued flange, avoids the need to use O-ring seals to provide a leak tight seal with the movable member. Avoiding having to use O-ring seals is desired because O-ring seals are known to both deteriorate over time when wetted with certain chemicals, e.g., acids or bases, and provide a known leak path after such deterioration. In addition to the creation of leak paths, the presence of a deteriorating O-ring within such a fluid handling device is not desired when transporting a high-purity chemical because of the introduction of debris and contaminates generated from such deterioration into the system.

Another feature of the dispense head assembly of this invention is the use of specifically designed tongue and groove seals between the dispense head body and the adapter to provide a leak-tight seal therebetween without the use of O-ring seals. The advantage of avoiding O-ring seals in this location is the same as that described above. Another feature of the dispense head assembly is the design of a one-piece dip tube adapter further eliminating leak paths within the dip tube adapter to zero.

A still other feature of dispense head assemblies of this invention is the coded mechanical interlocking system and the visual color coded attachment system between the dispense head body and dip tube adapter to ensure that only those bodies and adapters used in identical chemical services are combined together. The use of these two systems avoids the potential for system contamination by unintentionally mixing bodies and adapters used with different chemicals together.

It is to be understood that dispense head assemblies as constructed in accordance with the principles of this invention of this invention, can be embodied differently than that specifically described above and as illustrated in FIGS. 1 to 8. Dispense head assemblies of this invention are well suited for use in dispensing all types of fluids. A particular application for such assemblies is to dispense process chemicals that are used, for example, in the semiconductor industry. In such applications, it is desired that all wetted assembly members, e.g., the diaphragm, the body, the adapter, and the dip tube all be made from materials that display good chemical and thermal resistance properties. Such properties are desirable if the assembly is to be used in the semiconductor manufacturing industry or in any other industry where corrosive chemicals are to be passed through the assembly and/or where it is desirable that a high degree of chemical purity of the process chemical passed through the assembly be maintained.

In the semiconductor manufacturing industry, highly corrosive process chemicals such as strong inorganic acids, strong inorganic bases, strong solvents, and peroxides are used during the etching operation and are oftentimes heated to enhance the etching action of the chemicals, and thus enhance the efficiency of the etching operation. It is, therefore, important that the dispense head assembly used in the process to dispense these chemicals be both chemically and thermally resistant to provide dependable operation without the potential for failure, which may result in leakage of the corrosive chemicals and associated vapors from the valve, where it could cause a hazard to the to the environment and/or a danger to nearby operators.

Additionally, it is important that the assembly be chemically resistant so that its components will not degrade upon contact with the process chemicals and introduce contamination into the chemically pure process liquids. The introduction of such contaminants may cause hundreds of thousands of dollars of damage to a batch of semiconductors undergoing treatment with such process chemicals.

In such application, it is desired that the wetted assembly elements be constructed from a fluoropolymer compound selected from the group of fluoropolymers including polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like. A particularly preferred material is Teflon® PEA or Teflon® PTFE, which are provided by DuPont Company of Wilmington, Del. Such materials are not damaged by corrosive, acidic, or caustic liquids and do not introduce contamination into chemically pure liquids. The non-wetted assembly members, e.g., the dispense head housing, piston, gland, handle, handle mount, and retainer ring, can be made from any suitable structural material. Since these assembly members are not wetted by the process fluid they can be made from such plastics as polypropylene and the like that can provide a suitable degree of structural rigidity for the particular application.

Each of the assembly members can be formed by either mold or machine process, depending on both the type of material that is chosen and the project budget. For example, in a preferred embodiment the diaphragm is formed from Teflon® PTFE by a machine process due to the nature of the selected material. Teflon® PTFE is a preferred material for the diaphragm because of its superior anti-fatigue characteristics. However, the diaphragm can also be made from Teflon® PFA, in which case it would be formed by molding process due to the different characteristics of this material.

Accordingly, it is to be understood that, within the scope of the appended claims, dispense head assemblies constructed according to principles of this invention may be embodied other than as specifically described herein.

What is claimed is:

1. A dispense head assembly comprising:
   a housing having a chamber disposed therein that extends from a partially-closed end to an opposite open end;
   a body attached to the housing open end and having a fluid passage disposed therein extending between opposite body ends, the fluid passage being in fluid-flow communication with a fluid inlet and a fluid outlet in the body, wherein the fluid passage includes a circular seal lip located between the fluid inlet and outlet;
   a piston disposed within the body and housing, the piston having a first end that extends through an opening in the partially-closed housing end, and a second end that is attached to a poppet/diaphragm, the poppet/diaphragm extending into the body fluid passage and including:
      an imperforate head that seats against the seal lip when placed into a closed position;
      a thin-walled sleeve that extends axially away from the head concentrically along a piston wall surface; and
      a tongue defining a terminal edge of the sleeve;
   a spring interposed between the piston and the partially-closed housing end to urge the poppet/diaphragm head against the seal lip; and
   a handle attached at one end to the piston first end to axially move the piston within the assembly between an opened and closed flow position;
   wherein the diaphragm sleeve rolls between opposite piston and assembly wall surfaces when the piston is moved axially within the assembly;
   a dip tube adapter connected to the dispense head assembly comprising:
      an adapter body comprising a fluid flow passage extending therethrough from a first end to an opposite second end;
      means disposed along the adapter body first end for forming a releasibly locking attachment with an end of the dispense head assembly body;
      a seal interposed between the dispense head assembly body and the adapter body, the seal including a first tongue projecting axially in one direction and a second tongue projecting axially in an opposite direction, and grooves disposed in the adapter body and the dispense head assembly body, the grooves having a wall thickness that is less than the wall thickness of a respective seal tongue to provide an interference fit therewith; and
      a dip tube attached to the second adapter body end.

2. A dispense head assembly comprising:
   a housing having a chamber disposed therein that extends from a partially-closed end to an opposite open end;
   a body attached to the housing open end and having a fluid passage disposed therein extending between opposite body ends, the fluid passage being in fluid-flow communication with a fluid inlet and a fluid outlet in the body, wherein the fluid passage includes a circular seal lip located between the fluid inlet and outlet;
   a piston disposed within the body and housing, the piston having a first end that extends through an opening in the partially-closed housing end, and a second end that is attached to a poppet/diaphragm, the poppet/diaphragm extending into the body fluid passage and including:
      an imperforate head that seats against the seal lip when placed into a closed position;
      a thin-walled sleeve that extends axially away from the head concentrically along a piston wall surface; and
      a tongue defining a terminal edge of the sleeve;
   a spring interposed between the piston and the partially-closed housing end to urge the poppet/diaphragm head against the seal lip; and
   a handle attached at one end to the piston first end to axially move the piston within the assembly between an opened and closed flow position;

wherein the diaphragm sleeve rolls between opposite piston and assembly wall surfaces when the piston is moved axially within the assembly;
a dip tube adapter connected to the dispense head assembly comprising:
an adapter body comprising a fluid flow passage extending therethrough from a first end to an opposite second end;
means disposed along the adapter body first end for forming a releasibly locking attachment with an end of the dispense head assembly body;
means disposed concentrically around the fluid flow passage for providing a leak-tight seal between the adapter body and the dispense head assembly body;
a retainer ring disposed concentrically around the adapter body;
a handle mount that is pivotably attached at one handle mount end to the retainer ring, the handle mount comprising a nose that projects outwardly towards dispense head assembly housing and that fits within a slot disposed in an outside surface of the dispense head assembly housing, the handle mount also including a pivot end that registers with the handle to provide axial piston movement when the nose and slot are engaged; and
a dip tube attached to the second adapter body end.

3. The assembly as recited in claim 2 wherein the assembly is free of O-ring seals.

4. The assembly as recited in claim 2 further comprising an annular gland disposed within the body and interposed axially between the housing and the body, the gland serving to fix the poppet/diaphragm tongue against a body end.

5. The assembly as recited in claim 2 wherein the body and poppet/diaphragm are formed from a fluoropolymeric material.

6. A dispense head assembly comprising:
a housing having a chamber disposed therein that extends from a partially-closed end to an opposite open end;
a body attached to the housing open end and having a fluid passage disposed therein extending between opposite body ends, the fluid passage being in fluid-flow communication with a fluid inlet and a fluid outlet in the body, wherein the fluid passage includes a circular seal lip located between the fluid inlet and outlet;
a piston disposed within the body and housing, the piston having a first end that extends through an opening in the partially-closed housing end, and a second end that is attached to a poppet/diaphragm, the poppet/diaphragm extending into the body fluid passage and including:
an imperforate head that seats against the seal lip when placed into a closed position;
a thin-walled sleeve that extends axially away from the head concentrically along a piston wall surface; and
a tongue defining a terminal edge of the sleeve;
a wear pad disposed around a wall surface of the piston disposed within the housing chamber;
a spring interposed between the piston and the partially-closed housing end to urge the poppet/diaphragm head against the seal lip; and
a handle attached at one end to the piston first end to axially move the piston within the assembly between an opened and closed flow position;
wherein the diaphragm sleeve rolls between opposite piston and assembly wall surfaces when the piston is moved axially within the assembly.

7. A dispense head assembly comprising:
a first assembly member having a chamber disposed therein that extends from a partially-closed end to an opposite open end;
a second assembly member attached to the first assembly member and having a fluid passage disposed therein that is coaxial with the chamber, the second assembly member including a fluid inlet and a fluid outlet that are each in fluid-flow communication the fluid passage, wherein the fluid passage includes a circular seal lip located between the fluid inlet and fluid outlet;
a piston disposed within the first assembly member and having a first end that extends through an opening in the first assembly member partially-closed end, and a second end that is attached to a poppet/diaphragm, the poppet/diaphragm disposed within the second assembly member and comprising:
an imperforate head that seats against the seal lip when placed into a closed position;
a thin-walled sleeve that extends axially away from the head and concentrically around a piston wall surface; and
a tongue around a terminal edge of the sleeve and interposed between the first and second assembly members;
a spring disposed within the chamber and interposed between the piston and the partially-closed end to urge the poppet/diaphragm head against the seal lip; and
a handle pivotably attached to the piston first end to axially move the piston within the second assembly member between an opened and closed flow position;
wherein the diaphragm sleeve rolls between opposite piston and assembly wall surfaces when the piston is moved axially within the assembly;
a dip tube adapter connected to the dispense head assembly and comprising:
a body having a fluid flow passage extending therethrough from a first body end to an opposite second body end, the body being attached at its first body end to the second assembly member, the fluid flow passage being in fluid flow communication with fluid passage in the second assembly member;
the body and second assembly member including means for providing a releasibly locking attachment therebetween;
a tongue and groove seal arrangement interposed between the body and second assembly member for providing a leak-tight seal therebetween; and
a dip tube attached to the body second end;
wherein the assembly and dip tube adapter are O-ring free.

8. The assembly as recited in claim 7 wherein the means for forming a releasibly locking attachment is in the form of projections extending outwardly from the second assembly member that are disposed within complementary recesses disposed along the body first end.

9. The assembly as recited in claim 7 wherein the poppet/diaphragm tongue is disposed within a groove in the second assembly member to provide a leak-tight seal therewith.

10. The assembly as recited in claim 9 further comprising an annular gland disposed within the second assembly member and interposed axially between the first assembly member and the poppet/diaphragm tongue to fix the poppet/diaphragm tongue against the second assembly member.

11. The assembly as recited in claim 7 wherein the second assembly member and the poppet/diaphragm are formed from a fluoropolymeric material.

12. A dispense head assembly comprising:
a first assembly member having a chamber disposed therein that extends from a partially-closed end to an opposite open end;
a second assembly member attached to the first assembly member and having a fluid passage disposed therein that is coaxial with the chamber, the second assembly member including a fluid inlet and a fluid outlet that are each in fluid-flow communication the fluid passage, wherein the fluid passage includes a circular seal lip located between the fluid inlet and fluid outlet;
a piston disposed within the first assembly member and having a first end that extends through an opening in the first assembly member partially-closed end, and a second end that is attached to a poppet/diaphragm, the poppet/diaphragm disposed within the second assembly member and comprising:
   an imperforate head that seats against the seal lip when placed into a closed position;
   a thin-walled sleeve that extends axially away from the head and concentrically around a piston wall surface; and
   a tongue around a terminal edge of the sleeve and interposed between the first and second assembly members;
a spring disposed within the chamber and interposed between the piston and the partially-closed end to urge the poppet/diaphragm head against the seal lip; and
a handle pivotably attached to the piston first end to axially move the piston within the second assembly member between an opened and closed flow position;
wherein the diaphragm sleeve rolls between opposite piston and assembly wall surfaces when the piston is moved axially within the assembly;
a dip tube adapter connected to the dispense head assembly and comprising:
   a body having a fluid flow passage extending therethrough from a first body end to an opposite second body end, the body being attached at its first body end to the second assembly member, the fluid flow passage being in fluid flow communication with fluid passage in the second assembly member;
   the body and second assembly member including means for providing a releasibly locking attachment therebetween;
   a tongue and groove seal arrangement interposed between the body and second assembly member for providing a leak-tight seal therebetween; and
   a dip tube attached to the body second end;
wherein the tongue and groove seal arrangement is in the form of an annular seal that includes a first tongue projecting axially in one direction and a second tongue projecting axially in an opposite direction, and grooves disposed in the body and the second assembly member, the grooves having a wall thickness that is less than the wall thickness of a respective seal tongue to provide an interference fit therewith.

13. A dispense head assembly comprising:
a first assembly member having a chamber disposed therein that extends from a partially-closed end to an opposite open end;
a second assembly member attached to the first assembly member and having a fluid passage disposed therein that is coaxial with the chamber, the second assembly member including a fluid inlet and a fluid outlet that are each in fluid-flow communication the fluid passage, wherein the fluid passage includes a circular seal lip located between the fluid inlet and fluid outlet;
a piston disposed within the first assembly member and having a first end that extends through an opening in the first assembly member partially-closed end, and a second end that is attached to a poppet/diaphragm, the poppet/diaphragm disposed within the second assembly member and comprising:
   an imperforate head that seats against the seal lip when placed into a closed position;
   a thin-walled sleeve that extends axially away from the head and concentrically around a piston wall surface; and
   a tongue around a terminal edge of the sleeve and interposed between the first and second assembly members;
a spring disposed within the chamber and interposed between the piston and the partially-closed end to urge the poppet/diaphragm head against the seal lip; and
a handle pivotably attached to the piston first end to axially move the piston within the second assembly member between an opened and closed flow position;
wherein the diaphragm sleeve rolls between opposite piston and assembly wall surfaces when the piston is moved axially within the assembly;
a dip tube adapter connected to the dispense head assembly and comprising:
   a body having a fluid flow passage extending therethrough from a first body end to an opposite second body end, the body being attached at its first body end to the second assembly member, the fluid flow passage being in fluid flow communication with fluid passage in the second assembly member;
   the body and second assembly member including means for providing a releasibly locking attachment therebetween;
   a tongue and groove seal arrangement interposed between the body and second assembly member for providing a leak-tight seal therebetween; and
   a dip tube attached to the body second end;
a retainer ring disposed concentrically around the body; and
a handle mount that is pivotably attached at one handle mount end to the retainer ring, the handle mount comprising a projection that extends outwardly towards the second assembly member and that fits within a slot disposed in an outside surface of the second assembly member when the second assembly member is rotatably aligned therewith, the handle mount also including a pivot end that registers with the handle to provide axial piston movement when the projection and slot are engaged.

14. A dispense head assembly comprising:
a first assembly member having a chamber disposed therein that extends from a partially-closed end to an opposite open end;
a second assembly member attached to the first assembly member and having a fluid passage disposed therein that is coaxial with the chamber, the second assembly member including a fluid inlet and a fluid outlet that are each in fluid-flow communication the fluid passage, wherein the fluid passage includes a circular seal lip located between the fluid inlet and fluid outlet;
a piston disposed within the first assembly member and having a first end that extends through an opening in the first assembly member partially-closed end, and a second end that is attached to a poppet/diaphragm, the poppet/diaphragm disposed within the second assembly member and comprising:
  an imperforate head that seats against the seal lip when placed into a closed position;
  a thin-walled sleeve that extends axially away from the head and concentrically around a piston wall surface; and
  a tongue around a terminal edge of the sleeve and interposed between the first and second assembly members;
a wear pad disposed around a wall surface of the piston disposed within the first assembly member chamber;
a spring disposed within the chamber and interposed between the piston and the partially-closed end to urge the poppet/diaphragm head against the seal lip; and
a handle pivotably attached to the piston first end to axially move the piston within the second assembly member between an opened and closed flow position;
wherein the diaphragm sleeve rolls between opposite piston and assembly wall surfaces when the piston is moved axially within the assembly.

15. A dispense head assembly comprising:
a first assembly member having a chamber disposed therein that extends from a partially-closed end to an opposite open end;
a second assembly member attached to the first assembly member and having a fluid passage disposed therein that is coaxial with the chamber, the second assembly member including a fluid inlet and a fluid outlet that are each in fluid-flow communication the fluid passage, wherein the fluid passage includes a circular seal lip located between the fluid inlet and fluid outlet;
a piston disposed within the first assembly member and having a first end that extends through an opening in the first assembly member partially-closed end, and a second end that is attached to a poppet/diaphragm, the poppet/diaphragm disposed within the second assembly member and comprising:
  an imperforate head that seats against the seal lip when placed into a closed position;
  a thin-walled sleeve that extends axially away from the head and concentrically around a piston wall surface; and
  a tongue disposed around a terminal edge of the sleeve and interposed between the first and second assembly members, the tongue being disposed within a groove in the second assembly member to form a leak-tight seal therebetween;
a spring disposed within the chamber and interposed between the piston and the partially-closed end to urge the poppet/diaphragm head against the seal lip;
a handle pivotably attached to the piston first end to axially move the piston within the second assembly member between an opened and closed flow position;
wherein the diaphragm sleeve rolls between opposite piston and assembly wall surfaces when the piston is moved axially within the assembly; and
a dip tube adapter comprising:
  a body having a fluid flow passage extending therethrough from a first body end to an opposite second body end, the body being attached at its first body end to the second assembly member, the fluid flow passage being in fluid flow communication with fluid passage in the second assembly member;
  means for providing a releasibly locking attachment between the body and second assembly member;
  a tongue and groove seal arrangement interposed between the body and second assembly member for providing a leak-tight seal therebetween; and
  a dip tube attached to the body second end.

16. The assembly as recited in claim 15 wherein the assembly is O-ring free.

17. The assembly as recited in claim 16 wherein the means for forming a releasibly locking attachment is in the form of projections extending outwardly from the second assembly member that are disposed within complementary recesses disposed along the body first end.

18. The assembly as recited in claim 15 wherein the tongue and groove seal arrangement is in the form of an annular seal that includes a first tongue projecting axially in one direction and a second tongue projecting axially in an opposite direction, and grooves disposed in the body and the second assembly member, the grooves having a wall thickness that is less than the wall thickness of a respective seal tongue to provide an interference fit therewith.

19. The assembly as recited in claim 15 further comprising:
a retainer ring disposed concentrically around the body; and
a handle mount that is pivotably attached at one handle mount end to the retainer ring, the handle mount comprising a projection that extends outwardly towards the second assembly member and that fits within a slot disposed in an outside surface of the second assembly member when the second assembly member is rotatably aligned therewith, the handle mount also including a pivot end that registers with the handle to provide axial piston movement when the projection and slot are engaged.

20. The assembly as recited in claim 15 further comprising a wear pad disposed around a wall surface of the piston disposed within the first assembly member chamber.

21. The assembly as recited in claim 15 further comprising an annular gland disposed within the second assembly member and interposed axially between the first assembly member and the poppet/diaphragm tongue to fix the poppet/diaphragm tongue against the second assembly member.

22. The assembly as recited in claim 15 wherein the second assembly member, the poppet/diaphragm, and the adapter are each formed from a fluoropolymeric material.

23. The assembly as recited in claim 15 wherein the second assembly member and the dip tube adapter comprise a tongue and groove key system in addition to the tongue and groove seal arrangement.

24. The assembly as recited in claim 15 wherein the dip tube includes a bellowed sidewall.

25. The assembly as recited in claim 15 wherein a tongue and groove seal arrangement provides a leak-tight seal between the dip tube and adapter body.

* * * * *

UNITED STATES PATENT AND TRADEMARK OFFICE
CERTIFICATE OF CORRECTION

PATENT NO. : 6,349,858 B1
DATED : February 26, 2002
INVENTOR(S) : Kenji A. Kingsford, Peter Nguyen and Tom J. Sievers It is certified that error appears in the above-identified patent and that said Letters Patent is hereby corrected as shown below:

<u>Title page,</u>
Item [57], ABSTRACT,
Line 1, change "comprise" to -- comprises --.

<u>Column 14,</u>
Lines 16-17, change "partially-closed" to -- partially closed --.
Lines 44, 54, 62-63, change "partially-closed" to -- partially closed -- (all occurrences).

<u>Column 15,</u>
Lines 39, 48 and 59, change "partially-closed" to -- partially closed -- (all occurrences).

<u>Column 16,</u>
Lines 3, 14 and 27, change "partially-closed" to -- partially closed -- (all occurrences).
Line 9, after "communication" and before "the" insert -- with --.

<u>Column 17,</u>
Lines 3, 15 and 27, change "partially-closed" to -- partially closed -- (all occurrences).
Line 9, after "communication" and before "the" insert -- with --.
Line 43, after "with" and before "fluid" insert -- the --.
Line 62, change "partially-closed" to -- partially closed --.

<u>Column 18,</u>
Line 1, after "communication" and before "the" insert -- with --.
Lines 7 and 19, change "partially-closed" to -- partially closed -- (both occurrences).
Line 57, change "partially-closed" to -- partially closed --.
Line 63, after "communication" and before "the" insert -- with --.

UNITED STATES PATENT AND TRADEMARK OFFICE
CERTIFICATE OF CORRECTION

PATENT NO. : 6,349,858 B1
DATED : February 26, 2002
INVENTOR(S) : Kenji A. Kingsford, Peter Nguyen and Tom J. Sievers It is certified that error appears in the above-identified patent and that said Letters Patent is hereby corrected as shown below:

Column 19,
Lines 1 and 16, change "partially-closed" to -- partially closed -- (both occurrences).
Lines 27, 38 and 54, change "partially-closed" to -- partially closed -- (all occurrences).
Line 33, after "communication" and before "the" insert -- with --.

Signed and Sealed this

Fourth Day of March, 2003

JAMES E. ROGAN
*Director of the United States Patent and Trademark Office*